(12) United States Patent
Zhou et al.

(10) Patent No.: US 9,096,796 B2
(45) Date of Patent: Aug. 4, 2015

(54) LUMINESCENT ELEMENT, PREPARATION METHOD THEREOF AND LUMINESCENCE METHOD

(75) Inventors: Mingjie Zhou, Guangdong (CN); Wenbo Ma, Guangdong (CN); Yugang Liu, Guangdong (CN); Jing Tang, Guangdong (CN); Chaopu Shi, Guangdong (CN); Qingtao Li, Guangdong (CN)

(73) Assignee: Ocean's King Lighting Science & Technology CO., LTD., Guangdong (CH)

( * ) Notice: Subject to any disclaimer, the term of this patent is extended or adjusted under 35 U.S.C. 154(b) by 680 days.

(21) Appl. No.: 13/392,398

(22) PCT Filed: Aug. 26, 2009

(86) PCT No.: PCT/CN2009/073517
§ 371 (c)(1),
(2), (4) Date: Feb. 24, 2012

(87) PCT Pub. No.: WO2011/022878
PCT Pub. Date: Mar. 3, 2011

(65) Prior Publication Data
US 2012/0146500 A1   Jun. 14, 2012

(51) Int. Cl.
*H01J 23/34* (2006.01)
*C09K 11/57* (2006.01)
(Continued)

(52) U.S. Cl.
CPC ............. *C09K 11/574* (2013.01); *C03C 14/004* (2013.01); *C03C 17/06* (2013.01);
(Continued)

(58) Field of Classification Search
USPC ................. 315/1; 313/483, 493, 503; 445/58; 428/450, 433, 336; 257/98; 438/29; 252/301.4 F, 301.6 F
See application file for complete search history.

(56) References Cited

U.S. PATENT DOCUMENTS 5,122,671 A   6/1992   Buchanan et al.
5,779,825 A * 7/1998   Moon ........................... 148/513
(Continued)

FOREIGN PATENT DOCUMENTS

CN   1270381 A   10/2000
CN   1270382 A   10/2000
(Continued)

OTHER PUBLICATIONS

International Preliminary Report on Patentability received for PCT Patent Application No. PCT/CN2009/073515, mailed on Mar. 8, 2012, 8 pages (5 pages of English Translation and 3 pages of IPRP).
(Continued)

*Primary Examiner* — Lincoln Donovan
*Assistant Examiner* — Thomas Skibinski
(74) *Attorney, Agent, or Firm* — Morrison & Foerster LLP (57) ABSTRACT

A luminescent element comprises: a luminescent substrate; and a metal layer with a metal microstructure formed on a surface of the luminescent substrate; the luminescent substrate comprises luminescent materials with a chemical composition of $Zn_2SiO_4$:Mn. A preparation method of a luminescent element and a luminescence method are also provided. The luminescent element has good luminescence homogeneity, high luminescence efficiency, good luminescence stability and simple structure, and can be used in luminescent device with ultrahigh brightness.

9 Claims, 4 Drawing Sheets

(51) Int. Cl.
  C03C 14/00 (2006.01)
  C03C 17/06 (2006.01)
  C09K 11/02 (2006.01)
  H01J 63/04 (2006.01)

(52) U.S. Cl.
  CPC ............... *C09K 11/02* (2013.01); *H01J 63/04* (2013.01); *C03C 2214/04* (2013.01); *C03C 2217/251* (2013.01); *Y10T 428/26* (2015.01)

(56) References Cited

U.S. PATENT DOCUMENTS

| | | | |
|---|---|---|---|
| 5,788,881 | A | 8/1998 | Chadha et al. |
| 5,851,317 | A | 12/1998 | Biner et al. |
| 6,465,946 | B1 | 10/2002 | Yoon et al. |
| 6,504,297 | B1 | 1/2003 | Heo et al. |
| 7,229,675 | B1* | 6/2007 | Paderov et al. ............... 427/529 |
| 7,423,368 | B2 | 9/2008 | Miyamae et al. |
| 7,799,444 | B2 | 9/2010 | Peuchert et al. |
| 2001/0048966 | A1 | 12/2001 | Trumble et al. |
| 2002/0158569 | A1 | 10/2002 | Wakahara et al. |
| 2005/0146724 | A1 | 7/2005 | Malak |
| 2006/0181196 | A1 | 8/2006 | Peuchert et al. |
| 2006/0192213 | A1 | 8/2006 | Ohwada et al. |
| 2007/0013300 | A1 | 1/2007 | Takahashi et al. |
| 2007/0059901 | A1 | 3/2007 | Majumdar et al. |
| 2007/0090748 | A1* | 4/2007 | Sasaguri ........................ 313/496 |
| 2007/0262699 | A1 | 11/2007 | Takahashi et al. |
| 2007/0290602 | A1 | 12/2007 | Hosotani et al. |
| 2009/0051268 | A1 | 2/2009 | You et al. |
| 2009/0117260 | A1 | 5/2009 | Ishii et al. |
| 2009/0135339 | A1 | 5/2009 | You et al. |
| 2012/0146499 | A1 | 6/2012 | Zhou et al. |
| 2012/0146501 | A1 | 6/2012 | Zhou et al. |
| 2012/0146502 | A1 | 6/2012 | Zhou et al. |
| 2012/0153821 | A1 | 6/2012 | Zhou et al. |

FOREIGN PATENT DOCUMENTS

| | | |
|---|---|---|
| CN | 1632052 A | 6/2005 |
| CN | 1745450 A | 3/2006 |
| CN | 1754408 A | 3/2006 |
| CN | 1769231 A | 5/2006 |
| CN | 1805105 A | 7/2006 |
| CN | 1962932 A | 5/2007 |
| CN | 101071751 A | 11/2007 |
| CN | 101442089 A | 5/2009 |
| EP | 0062993 A1 | 10/1982 |
| EP | 0992463 A1 | 4/2000 |
| EP | 1246262 A2 | 10/2002 |
| EP | 1589555 A1 | 10/2005 |
| EP | 1642869 A1 | 4/2006 |
| EP | 1695946 A2 | 8/2006 |
| GB | 2000173 A | 1/1979 |
| JP | 1-149888 A | 6/1989 |
| JP | 2-18841 A | 1/1990 |
| JP | 5-89800 A | 4/1993 |
| JP | 2000-109823 A | 4/2000 |
| JP | 2000-159543 A | 6/2000 |
| JP | 2000-290646 A | 10/2000 |
| JP | 2002-141000 A | 5/2002 |
| JP | 2004-88011 A | 3/2004 |
| JP | 2005-11701 A | 1/2005 |
| JP | 2005-54182 A | 3/2005 |
| JP | 2007-103052 A | 4/2007 |
| JP | 2007-153626 A | 6/2007 |
| WO | 2003/058728 A1 | 7/2003 |

OTHER PUBLICATIONS

International Preliminary Report on Patentability received for PCT Patent Application No. PCT/CN2009/073517, mailed on Mar. 8, 2012, 12 pages (7 pages of English Translation and 5 pages of IPRP).
International Preliminary Report on Patentability received for PCT Patent Application No. PCT/CN2009/073518, mailed on Mar. 8, 2012, 12 pages (7 pages of English Translation and 5 pages of IPRP).
International Preliminary Report on Patentability received for PCT Patent Application No. PCT/CN2009/073520, mailed on Mar. 8, 2012, 12 pages (7 pages of English Translation and 5 pages of IPRP).
International Preliminary Report on Patentability received for PCT Patent Application No. PCT/CN2009/073522, mailed on Mar. 8, 2012, 10 pages (6 pages of English Translation and 4 pages of IPRP).
Office Action received for European Patent Application No. 09848608.7, mailed on Sep. 9, 2013, 5 pages.
Office Action received for Chinese Patent Application No. 200980161086.3, mailed on Aug. 2, 2013, 4 pages of Official copy only. See Statement Under 37 CFR § 1.98(a) (3).
Office Action received for Chinese Patent Application No. 200980161087.8, mailed on Aug. 14, 2013, 4 pages of Official copy only. See Statement Under 37 CFR § 1.98(a) (3).
Office Action received for Chinese Patent Application No. 200980161088.2, mailed on Aug. 27, 2013, 5 pages of Official copy only. See Statement Under 37 CFR § 1.98(a) (3).
Office Action received for Chinese Patent Application No. 200980161090.X, mailed on Sep. 29, 2013, 7 pages of Official copy only. See Statement Under 37 CFR § 1.98(a) (3).
Office Action received for Japanese Patent Application No. 2012-525840, mailed on Sep. 3, 2013, 3 pages of Official copy only. See Statement Under 37 CFR § 1.98(a) (3).
Office Action received for Japanese Patent Application No. 2012-525838, mailed on Sep. 17, 2013, 4 pages of Official copy only. See Statement Under 37 CFR § 1.98(a) (3).
Office Action received for Japanese Patent Application No. 2012-525837, mailed on Dec. 3, 2013, 3 pages of Official copy only. See Statement Under 37 CFR § 1.98(a) (3).
Office Action received for Japanese Patent Application No. 2012-525835, mailed on Dec. 3, 2013, 3 pages of Official copy only. See Statement Under 37 CFR § 1.98(a) (3).
Aisaka et al., "Enhancement of Upconversion Luminescence of Er Doped Al2O3 Films by Ag Island Films", Applied Physics Letters, vol. 92, 2008, pp. 132105-1-132105-3.
Nagakura, Shigeru, "Metal Back Plate Fluorescence", Crystallographic Society of Japan Journal, vol. 23, 1981, pp. 299-301(Official Language Copy). See Statement Under 37 CFR § 1.98(a) (3).
Extended European Search Report and Search Opinion received for EP Patent Application Na 09848608.7, mailed on May 17, 2013, 7 pages.
Extended European Search Report and Search Opinion received for EP Patent Application No. 09848610.3, mailed on Dec. 17, 2012, 4 pages.
Office Action received for Japanese Patent Application No. 2012-525839, mailed on May 7, 2013, 3 pages of official copy only.
International Search Report received for PCT Patent Application No. PCT/CN2009/073515, mailed on Jun. 3, 2010, 8 pages (4 pages of English Translation and 4 pages of PCT Search Report).
International Search Report received for PCT Patent Application No. PCT/CN2009/073517, mailed on Jun. 3, 2010, 10 pages (5 pages of English Translation and 5 pages of PCT Search Report).
International Search Report received for PCT Patent Application No. PCT/CN2009/073518, mailed on Jun. 3, 2010, 10 pages (5 pages of English Translation and 5 Pages of PCT Search Report).
International Search Report received for PCT Patent Application No. PCT/CN2009/073520, mailed on Jun. 3, 2010, 10 pages (5 pages of English Translation and 5 pages of Search Report).
International Search Report received for PCT Patent Application No. PCT/CN2009/073522, mailed on Jan. 14, 2010, 8 pages (4 pages of English Translation and 4 pages of Search Report).
Hong et al., "Comparison of Dynamics of Eu3+ in Different Y2O3 Nanostructured Materials and with Sol-Gel Produced SiO2 Glass", Journal of Luminescence, vol. 83-84, 1999, pp. 393-398.
Psuja et al., "Fabrication, Luminescent Properties and Possible Photonics Application of Eu:Y2 O3 Nanoparticles", 2008 International Students and Young Scientists Workshop "Photonics and Microsystems", Jun. 20-22, 2008, pp. 68-72.

(56) References Cited

OTHER PUBLICATIONS

Yl et al., "Enhanced Luminescence of Pulsed-Laser-Deposited Y2O3:Eu3+ Thin-Film Phosphors by Li Doping", Applied Physics Letters, vol. 81, No. 18, Oct. 28, 2002, pp. 3344-3346.

Extended European Search Report (includes Supplementary European Search Report and Search Opinion) received for European Patent Application No. 09848611.1, mailed on Jun. 2, 2014, 11 pages.

Extended European Search Report (includes Supplementary European Search Report and Search Opinion) received for European Patent Application No. 09848612.9, mailed on Jun. 18, 2014, 10 pages.

Extended European Search Report (includes Supplementary European Search Report and Search Opinion) received for European Patent Application No. 09848613.7, mailed on Jun. 17, 2014, 8 pages.

Non-Final Office Action received for U.S. Appl. No. 13/392,384, mailed on Dec. 24, 2014, 8 pages.

Non-Final Office Action received for U.S. Appl. No. 13/392,407, mailed on Dec. 26, 2014, 9 pages.

Non-Final Office Action received for U.S. Appl. No. 13/392,420, mailed on Dec. 31, 2014, 10 pages.

Non Final Office Action received for U.S. Appl. No. 13/392,449, mailed on Jan. 28, 2015, 11 pages.

Ehrt, D., "Structure, Properties and Applications of Borate Glasses", Glass Technology, vol. 41, No. 6, Dec. 2000, pp. 182-185.

Sohn et al., "Luminescence of Pulsed Laser Deposited Y2SiO5:Tb3+ Thin Film Phosphors on Fiat and Corrugated Quartz Glass Substrates", Japanese Journal of Applied Physics, vol. 44, No. 4A, 2005, pp. 1787-1791.

* cited by examiner

LUMINESCENT ELEMENT, PREPARATION METHOD THEREOF AND LUMINESCENCE METHOD

CROSS REFERENCE TO RELATED APPLICATIONS

This application is a national stage of International Patent Application Serial No. PCT/CN2009/073517, filed Aug. 26, 2009, which is hereby incorporated by reference in the present disclosure in its entirety.

FIELD OF THE INVENTION

The present disclosure relates to luminescent materials, and more particularly relates to a luminescent element including a glass substrate made of luminescent material, preparation method thereof and luminescence method.

BACKGROUND OF THE INVENTION

The conventional materials used as luminescent substrate include phosphor, nanocrystal, glass, etc. Comparing to the crystal and phosphor, the glass is transparent, rigid, and has excellent chemical stability and superior luminescent performance. In addition, the glass can be easily machined into products with various shapes, which shows potential for application in display devices or luminescent light sources.

For example, in vacuum microelectronics, field emission devices usually use luminescent substrate as illuminant, which has shown a wide prospect in illumination and display techniques and draws a lot attention to domestic and foreign research institutes. The working principle of the field emission device is that, in vacuum, the anode applies a positive voltage to the field emissive arrays (FEAs) to form an accelerating electric field, electron emitted from the cathode accelerating bombards the luminescent material on the anode plate to irradiate. The field emission device has a wide operating temperature range (−40° C.~80° C.), short corresponding time (<1 ms), simple structure, low energy consumption, and meets the environmental protection requirements. Furthermore, materials such as the phosphor, luminescent substrate, luminescent film, etc can be served as luminescent material in field emission device, however, they all suffer from serious problems of low luminous efficiency, thus significantly limit the application of the field emission device, especially in the application of illumination.

SUMMARY OF THE INVENTION

In one aspect of the present disclosure, a luminescent element with a high luminescent homogeneity, high luminous efficiency, good stability, simple structure and a preparation method with a simple process and low cost are desired.

In another aspect of the present disclosure, a luminescence method of the luminescent element with simple operation, good reliability, and improving luminous efficiency is also desired.

A luminescent element includes: a luminescent substrate; and a metal layer with a metal microstructure formed on a surface of the luminescent substrate; wherein the luminescent substrate has a chemical composition of $Zn_2SiO_4$:Mn.

A preparation method of a luminescent element includes: preparing a luminescent substrate, wherein the luminescent substrate includes luminescent materials with a chemical composition of $Zn_2SiO_4$:Mn; forming a metal layer on a surface of the luminescent substrate, and annealing the luminescent substrate and the metal layer in vacuum to form a metal microstructure of the metal layer, and then cooling the luminescent substrate and the metal layer to form the luminescent element.

A luminescence method of a luminescent element includes: obtaining the luminescent element according to the preparation method described above; and emitting cathode-ray to the metal layer, forming a surface plasmon between the metal layer and the luminescent substrate by the radiation of the cathode-ray and then irradiating the luminescent substrate.

In the present disclosure described above, the metal layer with a metal microstructure is formed on a surface of the luminescent substrate, and irradiated by the cathode-ray, a surface plasmon can be formed between the metal layer and the luminescent substrate. Due to the surface plasmon effect, the internal quantum efficiency of the luminescent substrate is highly increased, and the spontaneous emission of the luminescent substrate is highly increased, so that the luminous efficiency of the luminescent substrate is improved and the low efficiency problem of the luminescent materials is overcome. Accordingly, in the luminescence method of the luminescent element, once emitting cathode-ray to the metal layer, the surface plasmon will be formed between the metal layer and the luminescent substrate, thus improving the luminous efficiency and reliability. The luminescent element has a simple two-layer structure for including the luminescent substrate and the metal layer. In addition, there is a uniform interface formed between the luminescent substrate and the metal layer, so that an excellent luminescent homogeneity and stability is achieved. In the luminescence method of the luminescent element, once emitting cathode-ray to the metal layer, the surface plasmon will be formed between the metal layer and the luminescent substrate, thus improving the luminous efficiency and reliability of the luminescent substrate.

The preparation method of the luminescent element of the present disclosure, the luminescent element can be obtained by forming a metal layer on the luminescent substrate and annealing the luminescent substrate and the metal layer, thus the preparation method is simple and has a low cost. The luminescent element can be widely applied to luminescent devices with ultra-high brightness and high-speed motion, such as field emission display.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
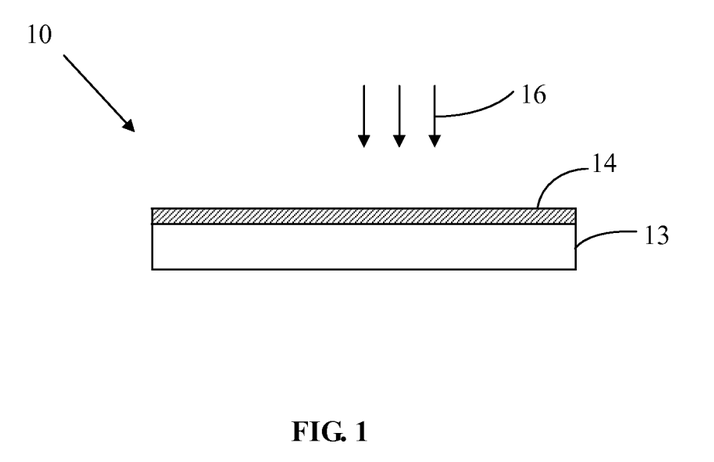
FIG. 1 is a schematic view of a luminescent element according to an embodiment of the present disclosure.

Referring to FIG. 1, an embodiment of a luminescent element includes a luminescent substrate 13 and a metal layer 14 formed on a surface of the luminescent substrate 13. The metal layer 14 has a metal microstructure, which may be called as micro-nano structure. In addition, the metal microstructure is aperiodic, i.e. composed of metal crystal in irregular arrangement.

In an embodiment of the present disclosure, the luminescent substrate 13 can be luminescent glass doped with luminescent materials with a chemical composition of $Zn_2SiO_4$:Mn, wherein the glass has a chemical composition of $20Na_2O-20BaO-30B_2O_3-30SiO_2$. The glass may made of glass powder with low melting point, but the glass is not limited to the material described above. The mass percentage of the luminescent materials with a chemical composition of $Zn_2SiO_4$:Mn in the luminescent substrate is 5%~35%.

In another embodiment of the present disclosure, the luminescent substrate 13 includes a transparent or translucent substrate and a luminescent film formed on the substrate with a chemical composition of $Zn_2SiO_4$:Mn, the metal layer 14 is formed on the luminescent film.

The metal layer 14 can be made of metals with excellent chemical stability, such as antioxidant and corrosion-resistant metals, or common metals. The metal layer 14 is preferably made of at least one metal selected from the group consisting of Au, Ag, Al, Cu, Ti, Fe, Ni, Co, Cr, Pt, Pd, Mg, and Zn, or more preferably made of at least one metal selected from the group consisting of Au, Ag, and Al. The metal layer 14 may be made of one metal or a composite metal. The composite metal may be an alloy of two or more than two metals described above. For example, the metal layer 14 may be an Ag/Al alloy layer or an Au/Al alloy layer, where the weight percent of Ag or Au is preferably more than 70%. The metal layer 14 has a thickness in a range of 0.5~200 nm, preferably 1~100 nm.

As a luminescent element, the luminescent element 10 can be widely applied to luminescent devices with ultra-high brightness and high-speed motion, such as field emission display, field emission light source, and large advertising display, etc. Take field emission display as an example, the anode applies a positive voltage to the field emission cathode to form an accelerating electric field, the cathode emits electron, i.e. cathode-ray 16 to the metal layer 14, so that a surface plasmon is formed between the metal layer 14 and the luminescent substrate 13. Due to the surface plasmon effect, the internal quantum efficiency of the luminescent substrate 13 is highly increased, and the spontaneous emission of the luminescent substrate is highly increased, so that the luminous efficiency of the luminescent substrate is improved and the low efficiency problem of the luminescent materials is overcome. In addition, since a metal layer is formed on the surface of the luminescent substrate 13, a uniform interface is formed between the whole metal layer and the luminescent substrate 13, thus improving the luminescent homogeneity.

Figure 2:
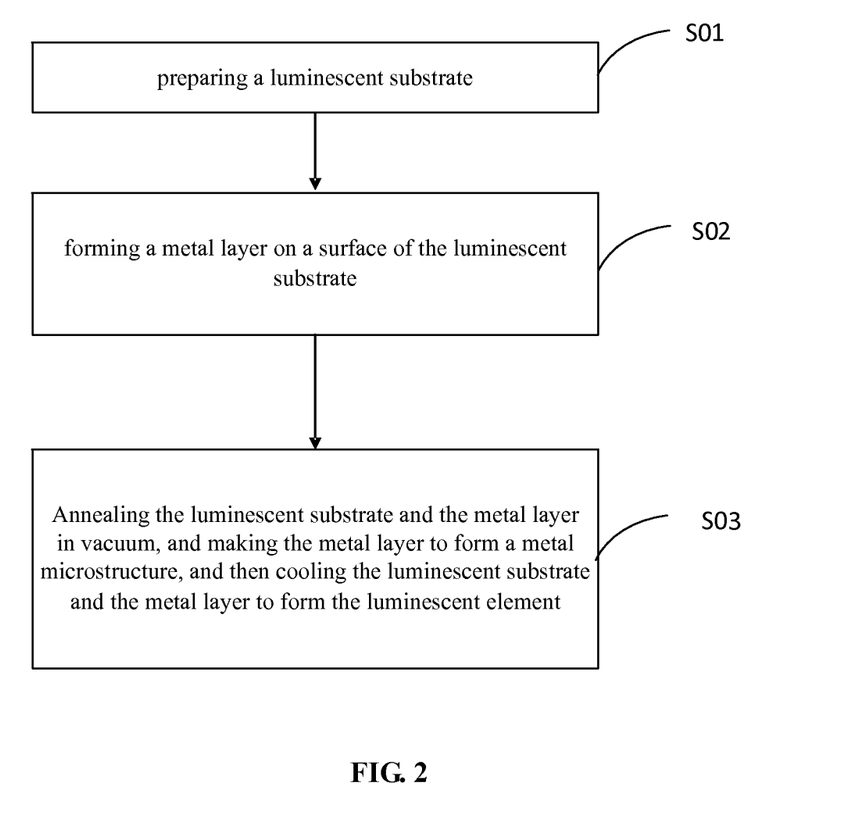
FIG. 2 is a flow chart of an embodiment of a preparation method of a luminescent element.

Referring to FIG. 1 and FIG. 2, a flow chart of an embodiment of a preparation method of a luminescent element is shown and includes following steps:

Step S01, the luminescent substrate 13 is prepared with a chemical composition of $Zn_2SiO_4$:Mn.

Step S02, the metal layer 14 is formed on a surface of the luminescent substrate 13.

Step S03, the luminescent substrate 13 and the metal layer 14 are annealed in vacuum to form the metal microstructure of the metal layer 14, and then the luminescent substrate 13 and the metal layer 14 are cooled to form the luminescent element 10.

In step S01, the luminescent substrate 13 described above can have two structures: the first luminescent structure is luminescent glass doped with luminescent materials with a chemical composition of $Zn_2SiO_4$:Mn, the second luminescent structure is the luminescent film formed on the substrate with a chemical composition of $Zn_2SiO_4$:Mn. The preparation of the first luminescent structure includes: mixing the luminescent materials with a chemical composition of $Zn_2SiO_4$:Mn and glass powder; melting at a temperature of 1200° C.; cooling to ambient temperature, and obtaining the luminescent glass doped with luminescent materials with a chemical composition of $Zn_2SiO_4$:Mn. The glass powder has a chemical composition of $20Na_2O-20BaO-30B_2O_3-30SiO_2$. The luminescent materials with a chemical composition of $Zn_2SiO_4$:Mn may also be powder. Mixing the luminescent materials and the glass powder in accordance with the mass ratio of 1:19~7:13, and the luminescent materials accounted for 5%~35% of the mixture; melting the mixture at a temperature of 1200° C.; placing the mixture on steel plates and cooling the mixture to ambient temperature; and obtaining the luminescent substrate 13.

The preparation of the second luminescent structure includes: forming a luminescent film on a surface of a transparent or translucent substrate, and the luminescent film has a chemical composition of $Zn_2SiO_4$:Mn. The luminescent film with a chemical composition of $Zn_2SiO_4$:Mn:Tb can be formed on the surface of the substrate by magnetron sputtering, electron beam evaporating, chemical vapor deposition, molecular beam epitaxy, pulsed laser deposition, or spray pyrolysis process.

As previously described, the metal layer 14 is formed by depositing metal source with excellent chemical stability, such as antioxidant and corrosion-resistant metals, or common metals. The metal layer 14 is preferably made of at least one metal selected from the group consisting of Au, Ag, Al, Cu, Ti, Fe, Ni, Co, Cr, Pt, Pd, Mg, and Zn, or more preferably made of at least one metal selected from the group consisting of Au, Ag, and Al. In step S02, the metal layer 14 is formed on the surface of the luminescent substrate 13 via PVD or CVD, such as but not limited to sputtering or evaporation, with at least one metal described above. The metal layer 14 has a thickness in a range of 0.5~200 nm, preferably 1~100 nm.

In step S03, after the formation of the metal layer 14 on the luminescent substrate 13, the metal layer 14 and the luminescent substrate 13 are annealed at a temperature in a range of 50~650° C. for 5 minutes to 5 hours and cooled to ambient temperature. The preferred anneal temperature is in a range of 100~600° C., and the preferred anneal time is in a range of 15 minutes to 3 hours.

Figure 3:
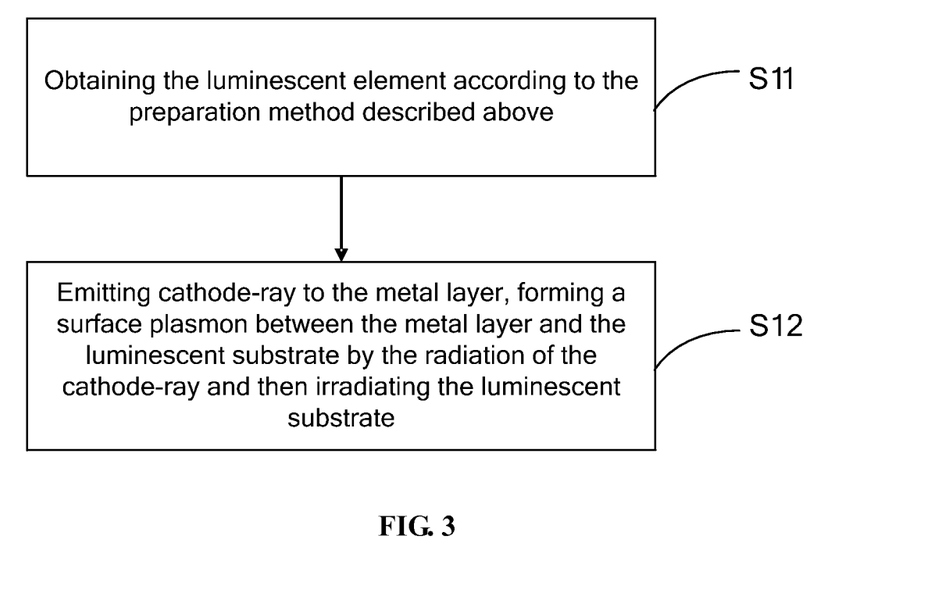
FIG. 3 is a flow chart of an embodiment of a luminescence method of using a luminescent element.

Referring to FIG. 1 and FIG. 3, a flow chart of a luminescence method of the luminescent element is shown and includes following steps:

Step S11, the luminescent element 10 is obtained according to the previously described preparation method.

Step S12, cathode-ray 16 is emitted to the metal layer 14. A surface plasmon is formed between the metal layer 14 and the luminescent substrate 13 by the radiation of the cathode-ray 16 and thus irradiating the luminescent substrate 13.

The luminescent element 10 has features of structure and composition as previously described. In application, the step S12 can be implemented by field emission display or illumination light source. In vacuum, the anode applies a positive voltage to the field emission cathode to form an accelerating electric field, so that the cathode emits cathode-ray 16. Excited by the cathode-ray 16, electron beam will penetrate the metal layer 14 and irradiate the luminescent substrate 13. During such process, a surface plasmon is formed between the metal layer 14 and the luminescent substrate 13. Due to the surface plasmon effect, the internal quantum efficiency of the luminescent substrate 13 is highly increased, and the spontaneous emission of the luminescent substrate is highly increased, so that the luminous efficiency of the luminescent substrate is improved.

As described above, the luminescent substrate 13 has two structures, based on the first structure, the electron beam penetrate the metal layer 14 and irradiate $Zn_2SiO_4$:Mn in the luminescent glass. During such process, a surface plasmon is formed between the surface of the luminescent glass doped with $Zn_2SiO_4$:Mn and the metal layer 14, and irradiates $Zn_2SiO_4$:Mn. Based on the second structure the electron beam penetrate the metal layer 14 and irradiate the luminescent film with a chemical composition of $Zn_2SiO_4$:Mn. During such process, a surface plasmon is formed between the surface of the luminescent film with a chemical composition of $Zn_2SiO_4$:Mn and the metal layer 14, and irradiates $Zn_2SiO_4$:Mn.

Surface plasmon (SP) is a wave spread along the interface between the metal and medium, whose amplitude exponentially decay with the increase of the distance away from the interface. When changing a surface structure of the metal, the feature, dispersion relationship, excitation mode, coupling effect of the surface plasmon polaritons (SPPs) will be significantly changed. The electromagnetic field caused by the SPPs can not only constrain the spread of the light wave in sub-wavelength size structure, but also can produce and manipulate the electromagnetic radiation from light frequency to microwave band, thus active manipulation of the light spread is implemented. Accordingly, the present embodiment uses the excitation of the SPPs to increase the optical density of the luminescent substrate and to enhance spontaneous emission velocity of the luminescent substrate. In addition, the coupling effect of the surface plasmon can be used, when the luminescent substrate irradiates, sympathetic vibration phenomena occurs, thus the internal quantum efficiency of the luminescent substrate is highly increased, so that the luminous efficiency of the luminescent substrate is improved.

A plurality of examples are described to illustrate the different compositions and preparation methods of the luminescent element, and their performances. In the following embodiments, the luminescent materials with a chemical composition of $Zn_2SiO_4$:Mn can be market sale.

Example 1

Phosphor with a composition of $Zn_2SiO_4$:Mn and glass powder are mixed in accordance with the mass ratio 1:4, and melted to obtain a luminescent glass doped with luminescent materials with the composition of $Zn_2SiO_4$:Mn. The glass powder has a chemical composition of $20Na_2O$-$20BaO$-$30B_2O_3$-$30SiO_2$. A silver layer with a thickness of 2 nm is deposited on a surface of the luminescent glass via a magnetron sputtering equipment. The luminescent glass and the silver layer are annealed at a temperature of 300° C. for half an hour in vacuum with the vacuum degree $<1\times10^{-3}$ Pa and cooled to ambient temperature, thus a luminescent element is obtained.

Figure 4:
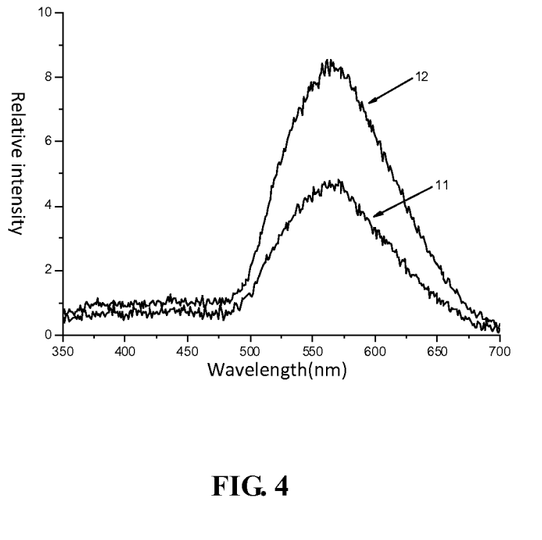
FIG. 4 is an emission spectrum of the luminescent element of Example 1 comparing with the luminescent substrate without the metal layer, the emission spectrum being tested by Shimadzu RF-5301PC spectrometer excited by cathode-ray of 5 KV accelerating voltage.

Spectrum of the luminescent element obtained above is tested. The prepared luminescent element is bombarded by cathode-ray from an electron gun, and the electron beam penetrates the metal layer and irradiates the luminescent glass doped with $Zn_2SiO_4$:Mn, thus an emission spectrum shown in FIG. 4 is obtained. As shown in FIG. 4, luminescent materials are green luminescent materials, curve 11 represents an emission spectrum of a luminescent substrate without the metal layer; curve 12 represents an emission spectrum of the luminescent element with the metal layer of Example 1. As shown in FIG. 4, since a surface plasmon is formed between the metal layer and the luminescent substrate, comparing to the luminescent substrate without the metal layer, the luminescent element with the metal layer of Example 1 has a luminescence integral intensity 2 times as that of the luminescent substrate without the metal layer in a wavelength of 350~700 nm, accordingly, the luminescent performance is greatly improved.

Other Examples have the similar emission spectrums and luminescent performance as Example 1, which will not be described later.

Example 2

Phosphor with a composition of $Zn_2SiO_4$:Mn and glass powder are mixed in accordance with the mass ratio 1:19, and melted to obtain a luminescent glass doped with luminescent materials with the composition of $Zn_2SiO_4$:Mn. The glass powder has a chemical composition of $20Na_2O$-$20BaO$-$30B_2O_3$-$30SiO_2$. A gold layer with a thickness of 0.5 nm is deposited on a surface of the luminescent glass via a magnetron sputtering equipment. The luminescent glass and the gold layer are annealed at a temperature of 200° C. for an hour in vacuum with the vacuum degree $<1\times10^{-3}$ Pa and cooled to ambient temperature, thus a luminescent element is obtained.

Example 3

Phosphor with a composition of $Zn_2SiO_4$:Mn and glass powder are mixed in accordance with the mass ratio 7:13, and melted to obtain a luminescent glass doped with luminescent materials with the composition of $Zn_2SiO_4$:Mn. The glass powder has a chemical composition of $20Na_2O$-$20BaO$-$30B_2O_3$-$30SiO_2$. A aluminum layer with a thickness of 200 nm is deposited on a surface of the luminescent glass via a magnetron sputtering equipment. The luminescent glass and the aluminum layer are annealed at a temperature of 500° C. for five hours in vacuum with the vacuum degree $<1\times10^{-3}$ Pa and cooled to ambient temperature, thus a luminescent element is obtained.

Example 4

A 1×1 cm², double-sided polished sapphire substrate is selected. A luminescent film with a composition of $Zn_2SiO_4$:Mn is formed on the sapphire substrate by magnetron sputtering, and a magnesium layer with a thickness of 100 nm is deposited on the surface of the luminescent film via an electron beam evaporation equipment. The luminescent film and the magnesium layer are annealed at a temperature of 650° C. for five minutes in vacuum with the vacuum degree $<1\times10^{-3}$ Pa and cooled to ambient temperature, thus a luminescent element is obtained.

Example 5

A 1×1 cm², double-sided polished magnesium oxide substrate is selected. A luminescent film with a composition of $Zn_2SiO_4$:Mn is formed on the magnesium oxide substrate by molecular beam epitaxy, and a palladium layer with a thickness of 1 nm is deposited on the surface of the luminescent film via an electron beam evaporation equipment. The luminescent film and the palladium layer are annealed at a temperature of 100° C. for three hours in vacuum with the vacuum degree $<1\times10^{-3}$ Pa and cooled to ambient temperature, thus a luminescent element is obtained.

Example 6

A 1×1 cm$^2$, double-sided polished magnesium oxide substrate is selected. A luminescent film with a composition of Zn$_2$SiO$_4$:Mn is formed on the magnesium oxide substrate by spray pyrolysis process, and a platinum layer with a thickness of 5 nm is deposited on the surface of the luminescent film via an electron beam evaporation equipment. The luminescent film and the platinum layer are annealed at a temperature of 450° C. for fifteen minutes in vacuum with the vacuum degree $<1\times10^{-3}$ Pa and cooled to ambient temperature, thus a luminescent element is obtained.

Example 7

A 1×1 cm$^2$, double-sided polished quartz substrate is selected. A luminescent film with a composition of Zn$_2$SiO$_4$:Mn is formed on the quartz substrate by magnetron sputtering, and a iron layer with a thickness of 20 nm is deposited on the surface of the luminescent film via an electron beam evaporation equipment. The luminescent film and the iron layer are annealed at a temperature of 50° C. for five hours in vacuum with the vacuum degree $<1\times10^{-3}$ Pa and cooled to ambient temperature, thus a luminescent element is obtained.

Example 8

A 1×1 cm$^2$, double-sided polished quartz substrate is selected. A luminescent film with a composition of Zn$_2$SiO$_4$:Mn is formed on the quartz substrate by magnetron sputtering, and a titanium layer with a thickness of 10 nm is deposited on the surface of the luminescent film via an electron beam evaporation equipment. The luminescent film and the titanium layer are annealed at a temperature of 150° C. for two hours in vacuum with the vacuum degree $<1\times10^{-3}$ Pa and cooled to ambient temperature, thus a luminescent element is obtained.

Example 9

A 1×1 cm$^2$, double-sided polished quartz substrate is selected. A luminescent film with a composition of Zn$_2$SiO$_4$:Mn is formed on the quartz substrate by magnetron sputtering, and a copper layer with a thickness of 50 nm is deposited on the surface of the luminescent film via an electron beam evaporation equipment. The luminescent film and the copper layer are annealed at a temperature of 200° C. for two and a half hours in vacuum with the vacuum degree $<1\times10^{-3}$ Pa and cooled to ambient temperature, thus a luminescent element is obtained.

Example 10

A 1×1 cm$^2$, double-sided polished quartz substrate is selected. A luminescent film with a composition of Zn$_2$SiO$_4$:Mn is formed on the quartz substrate by magnetron sputtering, and a zinc layer with a thickness of 150 nm is deposited on the surface of the luminescent film via an electron beam evaporation equipment. The luminescent film and the zinc layer are annealed at a temperature of 350° C. for half an hour in vacuum with the vacuum degree $<1\times10^{-3}$ Pa and cooled to ambient temperature, thus a luminescent element is obtained.

Example 11

A 1×1 cm$^2$, double-sided polished quartz substrate is selected. A luminescent film with a composition of Zn$_2$SiO$_4$:Mn is formed on the quartz substrate by magnetron sputtering, and a chromium layer with a thickness of 120 nm is deposited on the surface of the luminescent film via an electron beam evaporation equipment. The luminescent film and the chromium layer are annealed at a temperature of 250° C. for two hours in vacuum with the vacuum degree $<1\times10^{-3}$ Pa and cooled to ambient temperature, thus a luminescent element is obtained.

Example 12

A 1×1 cm$^2$, double-sided polished quartz substrate is selected. A luminescent film with a composition of Zn$_2$SiO$_4$:Mn is formed on the quartz substrate by magnetron sputtering, and a nickel layer with a thickness of 40 nm is deposited on the surface of the luminescent film via an electron beam evaporation equipment. The luminescent film and the nickel layer are annealed at a temperature of 80° C. for four hours in vacuum with the vacuum degree $<1\times10^{-3}$ Pa and cooled to ambient temperature, thus a luminescent element is obtained.

Example 13

A 1×1 cm$^2$, double-sided polished quartz substrate is selected. A luminescent film with a composition of Zn$_2$SiO$_4$:Mn is formed on the quartz substrate by magnetron sputtering, and a cobalt layer with a thickness of 180 nm is deposited on the surface of the luminescent film via an electron beam evaporation equipment. The luminescent film and the cobalt layer are annealed at a temperature of 400° C. for an hour in vacuum with the vacuum degree $<1\times10^{-3}$ Pa and cooled to ambient temperature, thus a luminescent element is obtained.

Example 14

Phosphor with a composition of Zn$_2$SiO$_4$:Mn and glass powder are mixed in accordance with the mass ratio 3:17, and melted to obtain a luminescent glass doped with luminescent materials with the composition of Zn$_2$SiO$_4$:Mn. The glass powder has a chemical composition of 20Na$_2$O-20BaO-30B$_2$O$_3$-30SiO$_2$. A gold/aluminum layer with a thickness of 0.5 nm is deposited on a surface of the luminescent glass via a magnetron sputtering equipment. In the gold/aluminum layer, the gold is about 80 weight %, and the aluminum is about 20 weight %. The luminescent glass and the gold/aluminum layer are annealed at a temperature of 200° C. for an hours in vacuum with the vacuum degree $<1\times10^{-3}$ Pa and cooled to ambient temperature, thus a luminescent element is obtained.

Example 15

Phosphor with a composition of Zn$_2$SiO$_4$:Mn and glass powder are mixed in accordance with the mass ratio 3:7, and melted to obtain a luminescent glass doped with luminescent materials with the composition of Zn$_2$SiO$_4$:Mn. The glass powder has a chemical composition of 20Na$_2$O-20BaO-30B$_2$O$_3$-30SiO$_2$. A silver/aluminum layer with a thickness of 15 nm is deposited on a surface of the luminescent glass via a magnetron sputtering equipment. In the silver/aluminum layer, the silver is about 90 weight %, and the aluminum is about 10 weight %. The luminescent glass and the silver/aluminum layer are annealed at a temperature of 200° C. for an hours in vacuum with the vacuum degree $<1\times10^{-3}$ Pa and cooled to ambient temperature, thus a luminescent element is obtained.

Example 16

A 1×1 cm², double-sided polished quartz substrate is selected. A luminescent film with a composition of $Zn_2SiO_4$:Mn is formed on the quartz substrate by magnetron sputtering, and a silver/aluminum layer with a thickness of 10 nm is deposited on the surface of the luminescent film via an electron beam evaporation equipment. In the silver/aluminum layer, the silver is about 80 weight %, and the aluminum is about 20 weight %. The luminescent film and the silver/aluminum layer are annealed at a temperature of 150° C. for two hours in vacuum with the vacuum degree <1×10⁻³ Pa and cooled to ambient temperature, thus a luminescent element is obtained.

Example 17

A 1×1 cm², double-sided polished magnesium oxide substrate is selected. A luminescent film with a composition of $Zn_2SiO_4$:Mn is formed on the magnesium oxide substrate by magnetron sputtering, and a gold/aluminum layer with a thickness of 10 nm is deposited on the surface of the luminescent film via an electron beam evaporation equipment. In the gold/aluminum layer, the gold is about 90 weight %, and the aluminum is about 10 weight %. The luminescent film and the gold/aluminum layer are annealed at a temperature of 150° C. for two hours in vacuum with the vacuum degree <1×10⁻³ Pa and cooled to ambient temperature, thus a luminescent element is obtained.

In Examples described above, the metal layer 14 with a metal microstructure is formed on a surface of the luminescent substrate 13, and irradiated by the cathode-ray, a surface plasmon can be formed between the metal layer 14 and the luminescent substrate 13. Due to the surface plasmon effect, the internal quantum efficiency of the luminescent substrate 13 is highly increased, and the spontaneous emission of the luminescent substrate is highly increased, so that the luminous efficiency of the luminescent substrate is improved and the problem of low efficiency of the luminescent materials is overcome. In the luminescence method of the luminescent element, once emitting cathode-ray to the metal layer 14, the surface plasmon will be formed between the metal layer 14 and the luminescent substrate 13, thus improving the luminous efficiency and reliability. The luminescent element 10 has a simple two-layer structure for including the luminescent substrate 13 and the metal layer 14. In addition, there is a uniform interface formed between the luminescent substrate 13 and the metal layer 14, so that an excellent luminescent homogeneity and stability is achieved. In a luminescence method using the luminescent element, once emitting cathode-ray to the metal layer 14, the surface plasmon will be formed between the metal layer 14 and the luminescent substrate 13, thus improving the luminous efficiency and reliability of the luminescent substrate 13.

In the embodiment of the preparation method of the luminescent element, the luminescent element can be obtained by forming a metal layer on the luminescent substrate and annealing the luminescent substrate and the metal layer, thus the preparation method is simple and has a low cost. The luminescent element can be widely applied to luminescent devices with ultra-high brightness and high-speed motion, such as field emission display.

Although the invention has been described in language specific to structural features and/or methodological acts, it is to be understood that the invention defined in the appended claims is not necessarily limited to the specific features or acts described. Rather, the specific features and acts are disclosed as sample forms of implementing the claimed invention.

What is claimed is:

1. A luminescent element, comprising:
   a luminescent substrate; and
   a metal layer with a metal microstructure formed on a surface of the luminescent substrate,
   wherein the luminescent substrate comprises luminescent materials with a chemical composition of $Zn_2SiO_4$:Mn,
   wherein the luminescent substrate is luminescent glass doped with luminescent materials with a chemical composition of $Zn_2SiO_4$:Mn, and
   wherein the luminescent glass has a chemical composition of $20Na_2O$-$20BaO$-$30B_2O_3$-$30SiO_2$.

2. The luminescent element according to claim 1, wherein the mass percentage of the luminescent materials with a chemical composition of $Zn_2SiO_4$:Mn in the luminescent substrate is 5%~35%.

3. The luminescent element according to claim 1, wherein the luminescent substrate comprises a transparent or translucent substrate and a luminescent film formed on the substrate with a chemical composition of $Zn_2SiO_4$:Mn, and the metal layer is formed on the luminescent film.

4. The luminescent element according to claim 1, wherein the metal layer is made of at least one metal selected from the group consisting of Au, Ag, Al, Cu, Ti, Fe, Ni, Co, Cr, Pt, Pd, Mg, and Zn.

5. The luminescent element according to claim 1, wherein the metal layer has a thickness in a range of 0.5 nm-200 nm.

6. A preparation method of a luminescent element, comprising:
   mixing luminescent materials with a chemical composition of $Zn_2SiO_4$:Mn and glass powder to form a mixture;
   melting the mixture at a temperature of 1200° C.;
   cooling the melted mixture to ambient temperature to obtain a luminescent substrate, wherein the luminescent substrate is a luminescent glass doped with the luminescent materials with a chemical composition of $Zn_2SiO_4$:Mn, wherein the glass powder has a chemical composition of $20Na_2O$-$20BaO$-$30B_2O_3$-$30SiO_2$;
   forming a metal layer on a surface of the luminescent substrate;
   annealing the luminescent substrate and the metal layer in vacuum to form a metal microstructure of the metal layer; and
   cooling the luminescent substrate and the metal layer to form the luminescent element.

7. A luminescence method of a luminescent element, comprising:
   preparing a luminescent substrate, wherein the luminescent substrate comprises luminescent materials with a chemical composition of $Zn_2SiO_4$:Mn;
   forming a metal layer on a surface of the luminescent substrate;
   annealing the luminescent substrate and the metal layer in vacuum to form a metal microstructure of the metal layer;
   cooling the luminescent substrate and the metal layer to form the luminescent element;
   emitting cathode-ray to the metal layer;
   forming a surface plasmon between the metal layer and the luminescent substrate by the radiation of the cathode-ray; and
   irradiating the luminescent substrate.

8. The luminescence method of claim 7, wherein the preparation of the luminescent substrate comprises:
- mixing the luminescent materials with a chemical composition of $Zn_2SiO_4$:Mn and glass powder to form a mixture;
- melting the mixture at a temperature of 1200° C.;
- cooling the melted mixture to ambient temperature; and
- obtaining a luminescent glass doped with luminescent materials with a chemical composition of $Zn_2SiO_4$:Mn, wherein the glass powder has a chemical composition of $20Na_2O$-$20BaO$-$30B_2O_3$-$30SiO_2$.

9. The luminescence method of claim 7, wherein the preparation of the luminescent substrate comprises:
- forming a luminescent film on a surface of a transparent or translucent substrate, wherein the luminescent film has a chemical composition of $Zn_2SiO_4$:Mn.

* * * * *